United States Patent [19]

Smart

[11] 3,883,640

[45] May 13, 1975

[54] SODIUM PERCARBONATE CRYSTALS

[75] Inventor: James Crosby Smart, Runcorn, England

[73] Assignee: Imperial Chemical Industries Limited, Millbank, London, SW1P 4QG, England

[22] Filed: Jan. 15, 1973

[21] Appl. No.: 323,351

[30] Foreign Application Priority Data
Jan. 26, 1972  United Kingdom................. 3680/72

[52] U.S. Cl................ 423/415 P; 23/300; 423/266
[51] Int. Cl............................................ C01c 15/10
[58] Field of Search........ 423/281, 415 P, 421, 266, 423/268; 23/300, 302

[56] References Cited
UNITED STATES PATENTS
1,237,128  8/1917  Weber et al..................... 423/415 P
2,120,430  6/1938  Rieche............................... 423/268
2,863,835  12/1958  Goldsmith et al.............. 423/281 X
3,109,706  11/1963  Leblon et al.................... 423/281 X
3,677,697  7/1972  Yanush............................ 423/415 P
3,770,390  11/1973  Teot.................................. 423/551

FOREIGN PATENTS OR APPLICATIONS
565,653  11/1944  United Kingdom............. 423/415 P
1,060,849  7/1959  Germany............................ 423/268

Primary Examiner—Oscar R. Vertiz
Assistant Examiner—Gary P. Straub
Attorney, Agent, or Firm—Cushman, Darby & Cushman

[57] ABSTRACT

Sodium percarbonate is obtained by adding to the reaction mixture organic polyelectrolytes to improve the particle size and chemical stability of the crystals.

2 Claims, No Drawings

SODIUM PERCARBONATE CRYSTALS

This invention relates to the manufacture of sodium percarbonate crystals.

According to the present invention, there is provided a process for the preparation of sodium percarbonate crystals which comprises crystallizing sodium percarbonate from an aqueous solution containing one or more water-soluble polyelectrolytes.

Preferably, the polyelectrolyte is selected from the following: amonium, alkali-metal and alkaline earth metal alginates; caragheenan; agar; furcelleran; water-soluble starch esters of polybasic acids; polyelectrolytic water-soluble cellulose esters and the ammonium, alkali-metal and alkaline earth metal salts thereof; and polyelectrolytic acrylic polymers.

The concentration of the polyelectrolyte in the solution is preferably at least 10 parts (for example, 100 to 10,000 parts) per million by weight of the sodium percarbonate to be crystallized from the solution.

Suitable starch esters include starch phosphate and starch sulphate. Suitable cellulose esters include cellulose sulphate and suitable cellulose ethers include carboxymethyl cellulose.

The preferred polyelectrolytes are the polyelectrolytic acrylic polymers, especially polymers or copolymers of methacrylic acid and acrylic acid and salts thereof. Particularly suitable salts include the sodium salts.

The polyelectrolytes may be added to the solution at any stage before crystallization starts to occur. If desired, they may be incorporated in the reaction mixture for the formation of the sodium percarbonate and it is most convenient to add the polyelectrolyte just prior to the commencement of reaction, if desired, mixed with one or both of the reactants.

Sodium percarbonate may, for example, be conveniently manufactured by adding aqueous hydrogen peroxide to aqueous sodium carbonate and then crystallising the product.

The process may be a batch process, in which case it is generally desirable to add, for example sodium chloride, to precipitate out the product. Alternatively, the process may be carried out in a continuous manner in which the reactants are mixed together and the product precipitates out and is separated and the mother liquor is recycled.

It is generally desirable to add a stabiliser to prevent decomposition of peroxide. Stabilisers which have been used include sodium silicate alone or in combination with a magnesium salt, such as magnesium sulphate. The use of silicates however may lead to difficulties caused by deposits of hydrated silica and it is preferred to add, as stabiliser, a chelating agent, for example ethylene diamine tetraacetic acid (EDTA) or a salt thereof. The concentration of chelating agent in the reaction mixture is preferably from 0.05 to 2%, by weight of the sodium percarbonate to be crystallized therefrom.

The addition of the polyelectrolytes according to the invention results in sodium percarbonate crystals having an increased overall size, strength, and greater chemical stability compared with products obtained when no crystal improvers are added or in which prior art additives, for example sodium tripolyphosphate, are used. The following advantages are also achieved:

a. More rapid filtration or centrifuging of the product.
b. More efficient separation of the product from its mother liquor by filtering or centrifuging.
c. Decrease in the amount of mother liquor inclusion by the product.
d. Increased resistance to crystal fracture and breakage due to shear, impact and attrition both within the reactor and during subsequent process stages of filtering or centrifuging and drying.

The invention is illustrated by the following Examples, in which percentages and parts are by weight, unless otherwise stated.

EXAMPLE 1

To a cooled stirred solution containing 13 percent sodium carbonate and 3.3 percent hydrogen peroxide, were fed solid sodium carbonate and aqueous 35 percent hydrogen peroxide in a molar ratio of 1:1.5. A solution of a polyacrylic acid sold under the trade name "Versicol E21" was added at the rate of 600 ppm of the sodium carbonate fed. Ethylene diamine tetraacetic acid was also added at a rate of 2000 ppm of the sodium carbonate fed.

The reaction was maintained at 15°C and the sodium percarbonate which settled out was removed regularly, filtered and dried at 60°C in a fluidised bed drier.

By way of comparison, the procedure was then repeated, replacing the polyacrylic acid by the same amount of sodium tripolyphosphate.

The results are shown in the following Table I:

Table I

| Additive | Polyacrylic Acid | Sodium Tripolyphosphate |
|---|---|---|
| Median particle size (microns) | 800 | 110 |
| % Retained on 150 BS mesh | 99.0 | 57.6 |
| % Moisture of solid product including water of crystallisation | 20.2 | 35.0 |
| Stability - loss of oxygen in three hours at 70°C | 0 | 1.7 |

The product resulting from addition of the polyacrylic acid showed far less attrition under test than that obtained from the addition of the sodium tripolyphosphate.

EXAMPLES 2-4

The procedure of Example 1 was repeated using different polyelectrolytes with results as indicated in the following Table II:

Table II

| Polyelectrolyte | Example 2 Sodium polyacrylate | Example 3 Sodium polyacrylate | Example 4 Sodium polymethacrylate |
|---|---|---|---|
| Amount used on sodium carbonate fed | 200 ppm | 600 ppm | 1000 ppm |
| Median particle size (microns) | 240 | 800 | 180 |
| % retained on 150 BS mesh | 90.0 | 99.0 | 70.0 |
| % moisture of solid product including water of crystallisation | 12.2 | 20.0 | 13-17 |
| Stability - loss of oxygen in three hours at 70°C | 0.4 | 0 | 0.33 |

The products obtained by the procedures of Examples 2, 3 3 and 4 once again showed far less attrition under test than the product obtained in Example 1 from the addition of sodium tripolyphosphate.

What we claim is:

1. In a process for the preparation of sodium percarbonate crystals from an aqueous solution of sodium percarbonate, the improvement which comprises incorporating in the said aqueous solution a water soluble acrylic polymer polyelectrolyte the concentration of said polyelectrolyte being between 10 and 10,000 parts per million by weight of sodium percarbonate to be crystallized from the said solution.

2. The process according to claim 1 wherein the acrylic polymer is selected from the group consisting of polymers and copolymers of acrylic and methacrylic acids and salts thereof.

* * * * *